United States Patent [19]
Lee

[11] Patent Number: 5,867,658
[45] Date of Patent: Feb. 2, 1999

[54] METHOD AND APPARATUS FOR IMPLEMENTING A STOP STATE FOR A PROCESSOR IN A MULTIPROCESSOR SYSTEM

[75] Inventor: Van Hoa Lee, Cedar Park, Tex.

[73] Assignee: International Business Machines Corporation, Armonk, N.Y.

[21] Appl. No.: 835,133

[22] Filed: Apr. 4, 1997

[51] Int. Cl.[6] .................................................. G06F 15/177
[52] U.S. Cl. ........................................................ 395/200.52
[58] Field of Search ..................................... 395/651, 652, 395/182.21, 184.01, 200.38, 200.52

[56] References Cited

U.S. PATENT DOCUMENTS

| | | |
|---|---|---|
| 4,335,426 | 6/1982 | Maxwell et al. ................. 395/200.52 |
| 5,257,378 | 10/1993 | Sideserf et al. ................. 395/200.52 |
| 5,287,511 | 2/1994 | Robinson et al. . |
| 5,444,850 | 8/1995 | Chang ............................... 395/200.52 |
| 5,499,352 | 3/1996 | Clift et al. . |
| 5,524,263 | 6/1996 | Griffith et al. . |
| 5,548,776 | 8/1996 | Colwell et al. . |
| 5,548,796 | 8/1996 | Ketchum . |
| 5,590,292 | 12/1996 | Wooten et al. . |
| 5,590,351 | 12/1996 | Sowadsky et al. . |
| 5,729,675 | 3/1998 | Miller et al. ..................... 395/200.52 |

*Primary Examiner*—William M. Treat
*Attorney, Agent, or Firm*—Liddell, Sapp, Zivley, Hill & LaBoon, L.L.P.

[57] ABSTRACT

One aspect of the invention relates to a method useful in a multiprocessor system for operating a processor. In one version of the invention, the method includes the steps of storing halt signature data in a register on the processor, the halt signature data being representative of whether the processor is in a halt state, storing start address data in memory which is accessible by the processor, executing an interruptible spin loop with the processor, and comparing the halt signature data with a predetermined halt signature to determine whether the processor is in a halt state when an interrupt is received and reading the start address data from memory to determine whether there is a request to start if the processor is in a halt state.

14 Claims, 7 Drawing Sheets start_of_bootrom:

.org    start_of_bootrom+0x100 soft_reset_excp:
    b    big_endian_sri    #
    .long    0x023CF04B    # Absolute branch to xFFF03C00
                                   # this instruction is in little
                                   # format.

.org    start_of_bootrom+0x200 machine_check_excp:
    .extern    big_endian_mci    #
    b    big_endian_mci    #
    .long    0x6400004C    # rfi instructionin in little
                                   # format.

.org    start_of_bootrom+0x3800 big_endian_sri:

\# This handler will do the followings:
\#    1.    If the System reset interrupt (SRI) is caused by power-on, then
\#          do normal power-on initialization
\#    2.    If not power-on SRI and the stopped state signature in R29 and
\#          R30.
\#          A. If the content of the word at the address pointed by R31
\#             is zero, then execute "rfi" to do a null action.
\#          B. If the content of the word at the address pointed by R31
\#             is non-zero,
\#             i) Big-endian path
\#               a. LR < - @ (R31)
\#               b. R3 < - @ (R31 + 4)
\#               c. @ (R31 ) < - 0
\#               d. @ (R31 - 4) < - 0
\#               e. execute "blr" instruction
\#             ii) Little-endian path
\#               a. SRR0 < @ (R31)
\#               b. R3 < - @ (R31 + 4)
\#               c. @ (R31) < - 0
\#               d. @ (R31 - 4) < - 0
\#               e. MSR(ILE) < - SRR1 (31)
\#               f. execute "rfi" instruction mfspr    r3,HID0    # Check Power on SRI?
    andis.    r0,r3,0x0001    #
    beq    set_nhr_bit    #

FIG. 5A

```
        addis   r4,r0, 0x1357          # Check stopped state signature
        ori     r4,r4,0x9EDF           # R29-R30 = 0x13579BDF87654321
        cmp     cr0, 0, r4, r29        #
        bne     do_reboot              #
        addi    r4, r0, 0x4321         #
        oris    r4, r4, 0x8765         #
        cmp     cr0, 0, r4, r30        #
        beq     is_stop_proc           # do_reboot:   # This SRI is for a system reboot.

addi    r0, r0, 0              # Write to system register @
        oris    r6, r0, 0xFF00         # 0xFF0000E8 to cause a system
        stw     r0, 0xE8 (r6)          # Power on reset
        sync                           #
        b       $                      # set_nbr_bit:
        ori     r3, r3, 0x0001         # Set NHR_BIT, and move on top
        mtspr   HID0, r3               # do power-on initialization
        .extern to_por_path            #
        b       to_por_path            # is_stop_proc:
        lwz     r4, 0 (r31)            #
        lwz     r3, 4 (r31)            #
        sync                           #
        cmpi    cr0, 0, r4, 0          # If it is started by another
        beq     no_cp                  # processor, get out and start
        addi    r0, r0, 0              # running code.
        stw     r0, 0 (r31)            #
        stw     r0, 4 (r31)            #
        dcbf    r0, r31                #
        sync                           #
        addi    r5, r0, 4              #
        dcbf    r5, r31                #
        sync                           #
        mtlr    r4                     #
        blr                            #
no_op:  rfi                            # Do nothing.
```

FIG. 5B

.org    start_of_bootrom+0x3C00

\# The following codes are the little-endian path of the SRI. The order of
\# the instructions are commented on the right side while the actual instructions
\# are stored in the system BootROM in little-endian format and munged. This
\# storage arrangement will cancel out the same action performed by the system
\# memory controller when it operates in little endian mode.

|  | | | | | |
|---|---|---|---|---|---|
|  | .long | 0xDF9B8460 | # | addis | r4, r0, 0x1357 |
|  | .long | 0x5713803C | # | ori | r4, r4, 0x9BDF |
|  | .long | 0x14008240 | # | cmp | cr0, 0, r4, r29 |
|  | .long | 0x00E8047C | # | bne | xxx |
|  | .long | 0x65878464 | # | addi | r4, r0, 0x4321 |
|  | .long | 0x21438038 | # | oris | r4, r4, 0x8765 |
|  | .long | 0x08008241 | # | cmp | cr0, 0, r4, r30 |
|  | .long | 0x00F0047C | # | beq | go_le |
| xxx: | .long | 0x00007F80 | # | rfi |  |
| go_le: | .long | 0x6400004C | # | lwz | r3, 0 (r31) |
|  | .long | 0x04009F80 | # | addi | r5, r0, 4 |
|  | .long | 0x0400A038 | # | lwz | r4, 4 (r31) |
|  | .long | 0x00000038 | # | sync |  |
|  | .long | 0xAC04007C | # | addi | r0, r0, 0 |
|  | .long | 0x30008241 | # | cmpi | cr0, 0, r4, 0 |
|  | .long | 0x0000042C | # | beq | no_cpl |
|  | .long | 0x04001F90 | # | stw | r0, 0 (r31) |
|  | .long | 0x00001F90 | # | stw | r0, 4 (r31) |
|  | .long | 0xAC04007C | # | dcbf | r0, r31 |
|  | .long | 0xACF8007C | # | sync |  |
|  | .long | 0xAC04007C | # | dcbf | r5, r31 |
|  | .long | 0xACF8057C | # | sync |  |
|  | .long | 0xA602DB7C | # | mtsrr0 | r4 |
|  | .long | 0xA6039A7C | # | mfsrr1 | r6 |
|  | .long | 0xDE83C550 | # | mfmsr | r5 |
|  | .long | 0xA600A07C | # | rlwimi | r5,r6, 16, 15, 15 |
|  | .long | 0x6400004C | # | mtmsr | r5 |
| no_cpl: | .long | 0x2401A07C | # | rfi |  |

FIG    5C

METHOD AND APPARATUS FOR IMPLEMENTING A STOP STATE FOR A PROCESSOR IN A MULTIPROCESSOR SYSTEM

TECHNICAL FIELD

This invention relates generally to computer systems, and more particularly, to multiprocessor systems. Still more specifically, the invention relates to a method for placing a processor in a stopped state in a multiprocessor system.

BACKGROUND OF THE INVENTION

In order to construct computer systems capable of processing large amounts of data, it is useful to employ multiple individual processors in a single system. One exemplary multiple processor system is the PowerPC symmetric multiple processor ("SMP") system which operates in accordance with the common hardware reference platform ("CHRP") architecture. This system is described in detail in "PowerPC Microprocessor Common Reference Platform: A System Architecture," ISBN 1-55860-394-8, available from IBM. However, combining several individual processors which are simultaneously capable of running in a single system, presents certain difficulties for the system designer. For example, when a multiprocessor system is first powered on, it is conventional that one processor is selected as the "master" to execute the system open firmware for starting, or "booting" a client operating system. Other processors must be put into a halt, or stopped state which does not interfere with the operation of the master processor. If one of the other processors were to come out of the stopped state while the master was booting the system, it is possible that it would begin accessing system memory, e.g., to perform a memory test, or testing I/O adapters, etc. This could cause coherency problems in system memory resulting in a failure of the boot operation.

Also, the CHRP architecture requires that the run time abstraction software ("RTAS") must ensure that a processor in a stopped state will not check stop, or otherwise fail if a machine check or system reset exception, also referred to as a system reset interrupt ("SRI"), occurs. Thus, although all processors in the stopped state will receive the exception, they must perform a null action and remain in the stopped state.

Some of these problems can be alleviated if all the processors used in the system are provided with a hardware implemented stop state. However, many processors, for example, the PowerPC family of processors, do not have a hardware implemented stop state. Moreover, a hardware implemented stop state may not always provide the flexibility required by system designers.

Accordingly, it is an object of the present invention to provide a method for implementing a stopped state for a processor in a multiprocessor system which overcomes these problems. Additional objects and advantages will become apparent in view of the following disclosure.

SUMMARY OF THE INVENTION

One aspect of the invention relates to a method useful in a multiprocessor system for operating a processor. In one embodiment, the method comprises storing stopped signature data in a register on the processor, the stopped signature data being representative of whether the processor is in a stopped state; storing start address data in memory which is accessible by the processor; executing an interruptible spin loop with the processor; comparing the stopped signature data with a predetermined stopped signature to determine whether the processor is in a stopped state when an interrupt is received; and reading the start address data from memory to determine whether there is a request to start if the processor is in a stopped state.

Another aspect of the invention relates to an apparatus useful in a multiprocessor system for operating a processor. In one embodiment, the apparatus comprises a means for storing halt signature data in a register on the processor, the halt signature data being representative of whether the processor is in a halt state; a means for storing start address data in memory which is accessible by the processor; a means for executing an interruptible spin loop with the processor; a means for comparing the halt signature data with a predetermined halt signature to determine whether the processor is in a halt state when an interrupt is received; and a means for reading the start address data from memory to determine whether there is a request to start if the processor is in a halt state.

BRIEF DESCRIPTION OF THE DRAWINGS

FIGS. 5A–5C illustrate exemplary machine code for a PowerPC processor stopped state according to an embodiment of the invention.

DETAILED DESCRIPTION OF EMBODIMENTS OF THE INVENTION

The present invention will be described with respect to embodiments adapted to the exemplary PowerPC architecture. However, it is to be understood that this is for purposes of illustration only, and other embodiments adapted to other architectures will be apparent to those of skill in the art in view of the present disclosure.

There are two characteristics of a processor in a stopped state, 1) the processor is halted, i.e., prevented from executing instructions which would potentially interfere with the operation of other processors in the system, and 2) the processor does a null action, i.e., does not come out of the halted state and interfere with the other processors operations, when a machine check or system reset exception occurs, unless it is specifically requested to do so.

A processor can be halted by causing it to execute an infinite loop, also referred to as a spin loop. With respect to the exemplary PowerPC microprocessor family, a PowerPC processor can be placed in an infinite loop by using the branch-to-itself instruction, i.e., b$. The instruction set for the PowerPC processors is described in detail in "PowerPC Microprocessor Family: The Programming Environrments," available from IBM. However, even though the processor is executing a spin loop, it may be popped out of the spin loop upon receipt of an interrupt which causes the instruction execution of the processor to proceed to an interrupt handler. It is therefore important to ensure that before the processor is placed into the stopped state, it has been properly configured to proceed to the correct interrupt handler, and only acknowledge certain selected interrupts.

Figure 1:
FIG. 1 depicts a machine state register in an exemplary PowerPC processor.

In the PowerPC processor, operation of the processor is controlled by a machine state register ("MSR"). FIG. 1 shows a copy of the MSR in a 32-bit PowerPC processor. As seen, there are numerous bits which control the operation of the PowerPC processor. The operation of each of these bits is described in detail in the publications described above. However, in order not to obscure the present invention, only certain bit settings will be described which are relevant to the invention.

In one embodiment, before the processor is placed in the infinite loop, the MSR(IP) bit is set high, or logical 1. The IP bit is the exception prefix. The setting of this bit specifies whether an exception vector offset is prepended with F's or O's. If the bit is low, or cleared, then exceptions are vectored to the physical address 0x000n_nrnn, in 32-bit implementations. If the bit is high then exceptions are vectored to the physical address 0xFFFn_nnnn, where nnnn is the offset of the exception. In this embodiment, the firmware for booting the system, referred to as the boot ROM, is located at the high end of the memory. Thus, all exceptions which interrupt the spin loop of the processor will be vectored into the boot ROM, rather than the kernel code which is stored in system memory. Of course, it will be recognized this is not necessarily true for a running processor which may have interrupts handled by handlers located in the kernel code.

Next, the MSR(EE) bit is cleared. This disables external interrupts from interrupting the stop state of the processor. This prevents the processor from being taken out of the stopped state in the event of an external interrupt. The MSR(IR) and MSR(DR) bits are also cleared to disable instruction and data address translation. This sets the context of the processor to correctly access the memory stored in the boot ROM. Finally, the MSR(ILE) bit is cleared in order to cause the processor to run the exception code in big endian mode. This embodiment of the invention provides two different exception handling paths depending on the endian mode of the system controller. This will be described in greater detail further herein.

Figure 2:
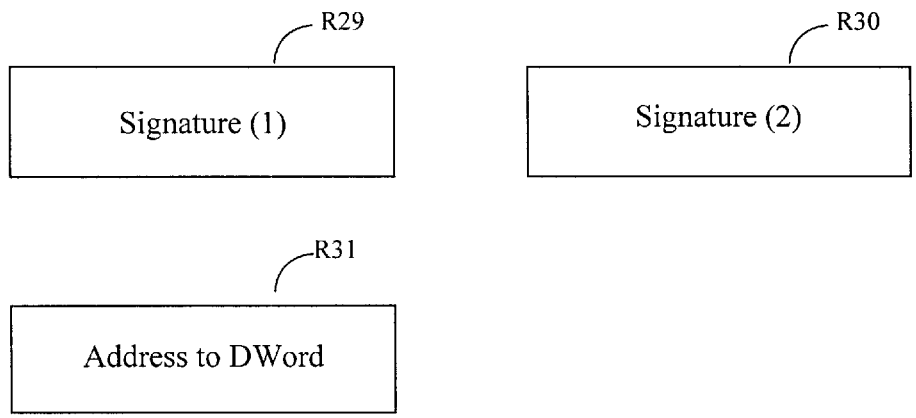
FIG. 2 depicts signature and mailbox registers according to an embodiment of the invention.

In addition to setting up the machine state register, the processor initializes three general purpose registers for use by the exception handler. This is shown in greater detail with respect to FIG. 2. FIG. 2 shows three registers, R29, R30 and R31, which have been initialized according to an embodiment of the present invention. Of course, it will be recognized that these particular registers have been chosen arbitrarily, and other registers on the processor could be used as a matter of design choice. Registers R29 and R30 each contain a portion of a unique signature to indicate that the processor is in the stopped state. This signature is used by the exception handler to determine whether the processor is in the stopped state for purposes of exception handling. Of course, there is a remote possibility that a processor may not be in a stopped state, but the registers, by coincidence, contain data which matches the signature of the stopped state at the time the exception occurs. This could cause the handler to incorrectly determine whether the processor is in a stopped state. To prevent this, in the embodiment shown, each register is 32-bits wide, and thus, the total signature is 64-bits. By using a 64-bit wide signature, it is extremely unlikely that all 64 bits would match with a predetermined signature, and thus, a running processor would not likely be mistaken to be in the stopped state by the exception handler.

Figure 3:
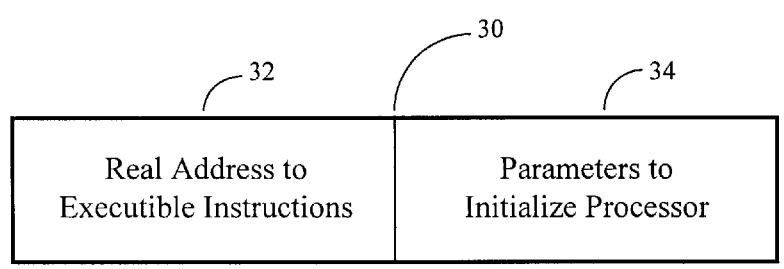
FIG. 3 depicts a mailbox location in system memory according to an embodiment of the invention.

A "mailbox" register, in this case register R31, is initialized with the address to a "mailbox" location, e.g., a double word (8-bytes), in system memory. The mailbox location is shown in FIG. 3. The upper word 32 of the mailbox location contains a real address in memory from which a processor which has been requested to begin running may begin instruction execution. It is also used to inform a stopped processor that is has been requested to begin running, i.e., by the fact that a non-zero value is stored in the mailbox. In one embodiment, the double word is initialized to 0. When a running processor uses the double word to start a stopped processor, the stopped processor resets the double word to 0 once it starts running.

The lower word 34 of the double word contains parameters used to initialize the processor when it begins. Various uses may be made of this location as a matter of design choice. In one embodiment, lower word 34 contains the address of a data structure in system memory which contains data used to initialize various registers in the processor. This allows the entire context of the processor to be set up before it begins execution of a certain code sequence. In one specific embodiment, this enables the system to perform processor switching in order to determine whether a processor on the system is properly operating. Specifically, a running processor may be used to execute a given code sequence to derive a result which is stored in system memory. Next, the register state of the running processor is stored in a data structure in memory. Finally, the running processor is placed into the stopped state. A stopped processor is then taken out of the stopped state and its registers are loaded with the context data stored in the memory structure which is specified by the lower word 34. The recently started processor is then caused to execute the same code sequence. The results are then compared, and if they are different, then it is possible that the system contains a faulty processor.

In one embodiment, when a processor is powered on, it executes instructions from the system boot ROM in big endian mode. Later, the endian mode of the processor will be changed to the operating mode of the system memory controller. When a machine check or system reset exception occurs, the stopped processors will be in big endian mode while the system memory controller may be in a little endian mode. Since the system boot ROM is normally in big endian format, this condition will likely lead to an unwanted program exception. To avoid this, the exception handlers for the machine check exception and the system reset exception in the system boot ROM will have two paths. The big endian path runs correctly when the system memory controller is in big endian mode. The little endian path will have little endian code and runs correctly when the system memory controller is in little endian mode. The operation of one embodiment of the invention is described in greater detail with the flow chart shown in FIGS. 4A–4B.

When the processor receives a power on reset, or system reset interrupt, flow proceeds to step 400 where the processor begins executing from 0xFFF00100. The offset 100 is determined as part of the PowerPC architecture. The upper part of the address has been vectored to this location by setting MSR (IP) high, as discussed previously. The handler is set up so that the processor will get different instructions when fetching from address 0xFFF00100 since the system memory controller may not be in the same endian mode as the processor. In other words, the processor is always set up to run in big endian mode upon entering this exception. However, the actual instruction returned from address 0xFFF0100 will depend on the endian mode of the memory controller since it controls the order of the individual bytes returned from a instruction read at 0100.

If the memory controller is in big endian mode then flow proceeds to step 402 where the processor determines whether the system reset interrupt is caused by a power on reset. This is generally done by checking a power on reset flag which is initially active when the system is first powered up. If the SRI was caused by a power on condition, then flow proceeds to step 418 where the power on reset flag is cleared. This prevents the system from taking this branch a second time, unless power has actually been turned off to the system. Afterwards, the processor proceeds to step 420 where it checks whether it is the master processor in a conventional manner. If the processor determines it is the master, then it continues with steps 428 and 430 where it performs such actions as directing the exceptions to a RAM vector, and it completes the normal boot process of the system.

If the processor is not a master, then in step 420 it proceeds to step 422 where it performs the operations described earlier, such as storing the stopped state signature into the assigned registers, storing the address of the restart code into another register, setting up the MSR to direct exceptions to the boot ROM, and finally in step 426 the processor executes the infinite loop to place itself in the stopped state.

If, in step 402, the SRI is not caused by a power on reset, then flow proceeds to step 404 where the processor compares the data stored in the stopped state signature registers with a predetermined stopped state signature from memory in order to determine whether it is actually in a stopped state. If the processor is running, then flow proceeds to step 414 and the processor performs a request to reboot the system in a conventional manner.

If the processor is in a stopped state, then flow proceeds from step 404 to step 406 where the processor next determines whether it is being requested to start running. In one embodiment, the processor determines whether there is a request for it to start running by testing whether there is a non-zero value in the memory location specified by the mailbox register. If so, then the processor proceeds to step 410 where it retrieves the context data to initialize its registers then proceeds to step 412 where it begins executing instructions at the address specified by the mailbox location. On the other hand, if the processor determines there is no request to start in step 406, then it simply proceeds to step 408 where it returns to the infinite loop.

The sequence followed if the memory controller is in little endian mode is similar to that in big endian mode, but there is no need to check whether the SRI is caused by a power on reset condition. Thus, in little endian mode, when a SRI is received, flow proceeds from step 400 to step 432 where the processor determines whether it is in the stopped state. According to an embodiment of the present invention, the little endian path should not be taken if the processor is not in the stopped state. However, if for some reason it is taken, then flow proceeds to step 444 where it returns from the interrupt. Otherwise, flow proceeds to step 434 where it determines whether there is a request to start. If not, then flow proceeds to step 436 and the processor returns to the spin loop. On the other hand, if there is a request to start then flow proceeds to steps 438 and 440 where the processor sets up the registers and begins executing an instruction sequence specified by the address stored in the mailbox location in substantially the same way as that described in the big endian mode.

Figure 4A:
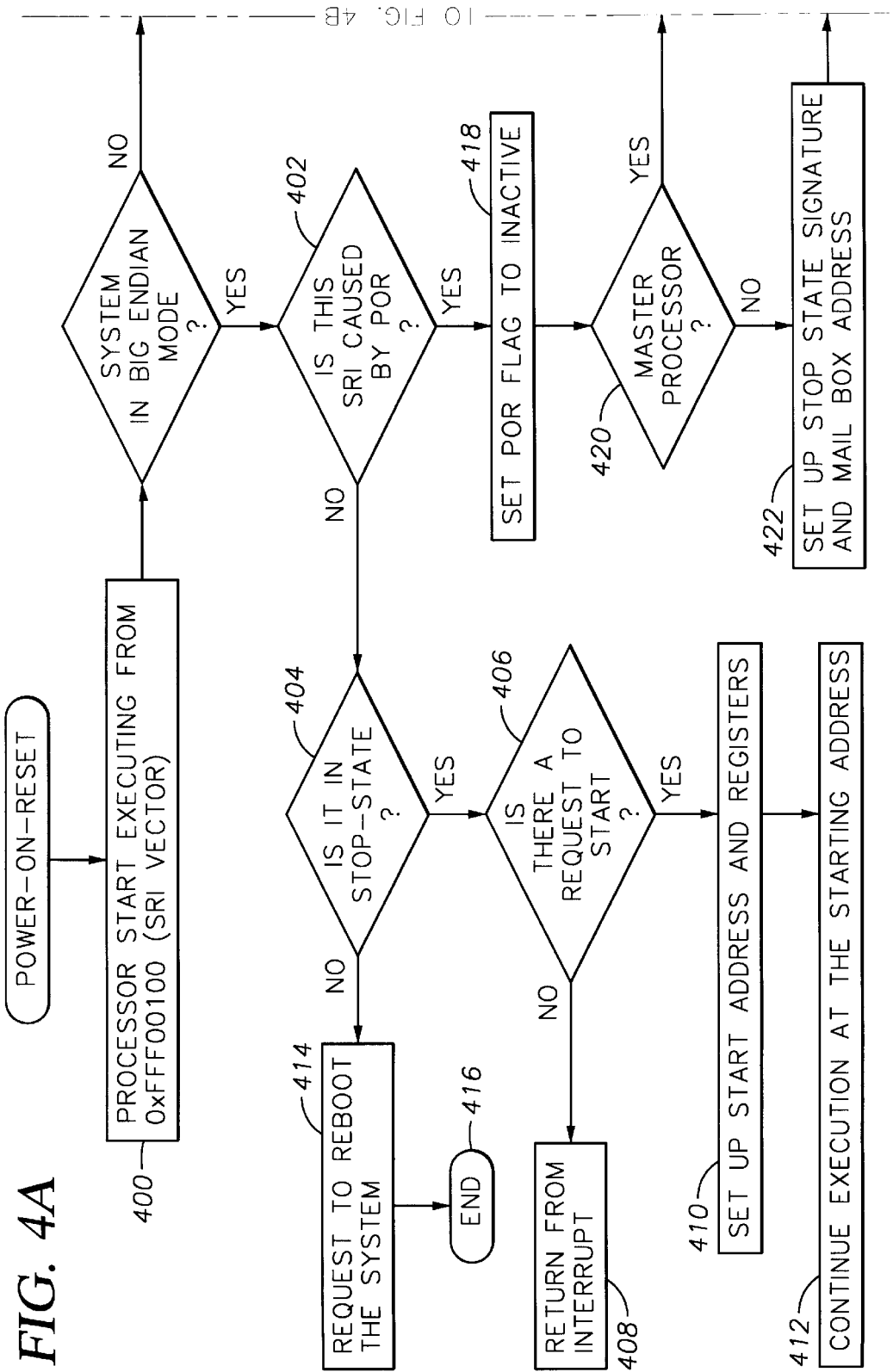
FIGS. 4A–4B is a flow chart illustrating the operation of stopped state according to an embodiment of the invention.
Figure 4B:
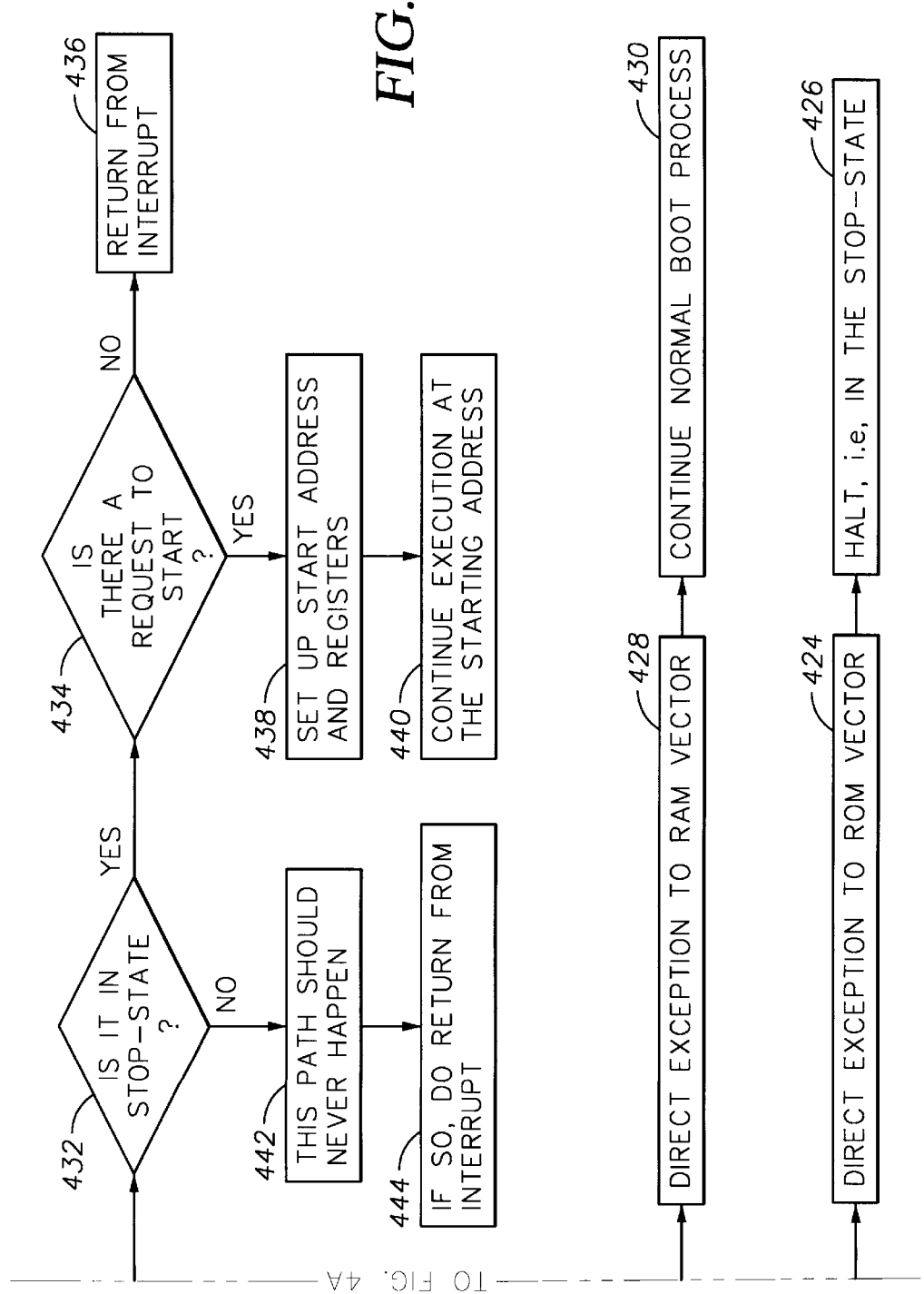

Of course, those of skill in the art will recognize that the actual implementation of the method described in the flow chart shown in FIGS. 4A–4B is a matter of design choice and will depend greatly on the specific processors used. One very specific embodiment of the invention is shown in FIGS. 5A–5C. FIGS. 5A–5C illustrate a machine code instruction sequence for a PowerPC processor which is useful according to an embodiment of the invention. Interpreting the code is believed within the abilities of those skilled in the art and only certain important features will be pointed out herein in order not to obscure the present invention. Although this exemplary sequence is for a system memory controller supporting true endian system memory, the procedure is easily modified in other embodiments for system memory controllers which only support big endian system memory even if it is running in little endian mode to support the I/O subsystem.

In this case, it is seen that the interrupt handler labeled "$big_{13}$ endian_sri" is located at offset 100 from the physical base address of the boot ROM. Thus, on a SRI, the processor will begin executing instructions at this location. If the memory controller is in little endian format, then there is an absolute branch to 0xFFF03C00 where the little endian handler is stored. Otherwise, the system executes the code sequence at label "big_endian_sri". In this case, the processor first checks to determine whether the SRI is caused by a power on. If so, the processor branches to set_nhr_bit where it sets the NHR bit, i.e., the flag to indicate a POR has occurred, to prevent re-execution of this code unless power is first turned off to the system. Afterwards, the processor branches to code at the label "to_por_path" which is essentially the power on reset sequence for the processor. This portion of the code is conventional and will depend on the actual system design. Accordingly, it is not shown in detail. If it is not caused by a power on reset, then the processor checks the stopped state signature. In this case, the stopped state signature is stored in the boot ROM as 0x13579BDF87654321, and this value is compared with the data stored in the signature registers R29 and R30. If the processor is not in the stopped state, then flow branches to "do_reboot" which is simply conventional reboot code and is not shown herein. Otherwise, the processor branches to the instruction sequence at is_stop_proc. In this case, the processor reads the data stored in the memory location specified by the mailbox register and either begins execution as described earlier, or executes an rfi instruction to re-enter the spin loop.

While the invention has been described with respect to the above embodiments, it is to be understood that other variations are within the scope and spirit of the present invention. All publications described herein are hereby incorporated by reference as though set forth in full.

What is claimed is:

1. A method useful in a multiprocessor system for operating a processor, the method comprising:

storing stopped signature data in a register on the processor, the stopped signature data being representative of whether the processor is in a stopped state;

storing start address data in memory which is accessible by the processor;

executing an interruptible spin loop with the processor;

comparing the stopped signature data with a predetermined stopped signature to determine whether the processor is in a stopped state when an interrupt is received; and reading the start address data from memory to determine whether there is a request to start if the processor is in a stopped state.

2. A method as in claim 1 further comprising returning to the processor to the interruptible spin loop if there is no request to start.

3. A method as in claim 1 further comprising executing instructions from a memory location specified by the start address data if there is a request to start.

4. A method as in claim 1 wherein the step of reading the start address from memory to determine whether there is a request to start comprises comparing the start address data with a predetermined value indicating there is no request to start.

5. A method as in claim 1 further comprising storing data representing the memory address of the stored start address data in a register on the processor such that the step of reading the start address data includes obtaining the address of the stored start address data from the register.

6. A method as in claim 3 further comprising:

storing a memory address in a register on the processor, the memory address specifying a location in memory which contains context data for the processor, wherein the context data is loaded into corresponding registers on the processors.

7. An method as in claim 3 wherein the memory location specified by the start address data is responsive to the endian mode of a memory controller.

8. An apparatus useful in a multiprocessor system for operating a processor, the apparatus comprising:

means for storing halt signature data in a register on the processor, the halt signature data being representative of whether the processor is in a halt state;

means for storing start address data in memory which is accessible by the processor;

means for executing an interruptible spin loop with the processor;

means for comparing the halt signature data with a predetermined halt signature to determine whether the processor is in a halt state when an interrupt is received; and means for reading the start address data from memory to determine whether there is a request to start if the processor is in a halt state.

9. An apparatus as in claim 8 further comprising means for returning to the processor to the interruptible spin loop if there is no request to start.

10. An apparatus as in claim 8 further comprising means for executing instructions from a memory location specified by the start address data if there is a request to start.

11. An apparatus as in claim 8 wherein the means for reading the start address from memory to determine whether there is a request to start comprises means for comparing the start address data with a predetermined value indicating there is no request to start.

12. An apparatus as in claim 8 further comprising means for storing data representing the memory address of the stored start address data in a register on the processor such that the step of reading the start address data includes obtaining the address of the stored start address data from the register.

13. An apparatus as in claim 10 further comprising:

means for storing a memory address in a register on the processor, the memory address specifying a location in memory which contains context data for the processor, wherein the context data is loaded into corresponding registers on the processors.

14. An apparatus as in claim 10 wherein the memory location specified by the start address data is responsive to the endian mode of a memory controller.

* * * * *

UNITED STATES PATENT AND TRADEMARK OFFICE
CERTIFICATE OF CORRECTION

PATENT NO. : 5,867,658
DATED : Feb. 2, 1999
INVENTOR(S) : Lee

It is certified that error appears in the above-identified patent and that said Letters Patent is hereby corrected as shown below:

Column 6, line 14, please delete " "big$_{13}$endian_sri" "and insert -- "big_endian_sri" --;

Signed and Sealed this

Twentieth Day of July, 1999

Attest:

Q. TODD DICKINSON

Attesting Officer

Acting Commissioner of Patents and Trademarks